United States Patent [19]

Matsushima et al.

[11] 4,369,263

[45] Jan. 18, 1983

[54] FRICTION MATERIAL CONTAINING STEEL WOOL AS REINFORCING AGENT

[75] Inventors: Noriaki Matsushima, Fujieda; Ken-ichi Noguchi, Yaizu; Kazuhisa Hirano, Fujieda, all of Japan

[73] Assignee: Sumitomo Durez Company Ltd., Tokyo, Japan

[21] Appl. No.: 216,586

[22] Filed: Dec. 15, 1980

[30] Foreign Application Priority Data

Dec. 27, 1979 [JP] Japan ................ 54-169282

[51] Int. Cl.³ .............................. C08L 61/06
[52] U.S. Cl. .................... 523/152; 523/153; 523/155; 523/156; 523/157; 523/158; 523/205; 523/208; 524/440
[58] Field of Search ............ 260/38, 998.13, DIG. 39; 523/152, 155, 156, 157, 158, 205, 208; 524/440; 428/378

[56] References Cited

U.S. PATENT DOCUMENTS

| | | | |
|---|---|---|---|
| 3,007,890 | 11/1961 | Twiss et al. | 260/38 |
| 3,267,048 | 8/1966 | Horste et al. | 260/38 |
| 3,455,868 | 7/1969 | D'Alessandro | 260/38 |
| 4,178,278 | 12/1979 | Reynolds | 260/38 |

FOREIGN PATENT DOCUMENTS 2003088  3/1979  United Kingdom ....... 260/DIG. 39

Primary Examiner—Lewis T. Jacobs
Attorney, Agent, or Firm—James F. Tao; James F. Mudd

[57] ABSTRACT

A friction material useful in automobile brakes and the like, comprises as a reinforcing agent steel wool coated with a thermosetting resin such as a phenolic resole resin.

11 Claims, No Drawings

FRICTION MATERIAL CONTAINING STEEL WOOL AS REINFORCING AGENT

BACKGROUND OF THE INVENTION

The present invention relates to a high performance friction material for use in automobile brakes which consists of steel wool as a major portion of the reinforcing material.

As used herein "friction particle" is intended to mean a particulate material having the properties of no substantial softening at elevated temperatures and a material which will not flow together or cohere with other particles, as would be the case with a "friction binder". A "friction particle" will not fuse with like friction particles, and is insoluble. A friction particle is held in place with a friction binder.

As used herein, a "friction binder" has the properties of flowability and adhesive and cohesive binding action, for the purpose of binding together a reinforcing material and other additives (including a friction particle) necessary for building a brake lining or other similar article of manufacture.

As used herein, a "friction material" is a composition useful as linings or facings in brakes, main clutches, and banded clutch facings of power transmission speed control structures of powerdriven devices such as automotive vehicles. Friction materials as now made are composed in general of a filamentous reinforcing material, bonded with a friction binder and containing other organic or mineral friction controlling agents such as friction particles.

Conventionally, components of friction materials consist of asbestos as a major portion of the reinforcing component and thermosetting resins, cashew-nut-shell-oil friction particles, barium sulfate, graphite etc. are incorporated therein. However, a problem has recently occurred because asbestos contains a carcinogenic substance. On the other hand, automotive makers have become more severe in requirements for this kind of friction material for reduction of friction wear. As a result, some suppliers have already begun to substitute other materials for asbestos to meet the requirements of better performance of friction material or to circumvent the regulations imposed on asbestos.

Among the reinforcements for non-asbestos friction materials, attention is called at the present time to steel wool because of its relatively low cost. However, when using steel wool for a reinforcement, the "wetting effect" of thermosetting resins, which perform as binders in the molding process, is inferior compared to asbestos. This results in a fatal drawback of lowering the strength of friction parts which is a vital physical characteristic.

SUMMARY OF THE INVENTION

To overcome the above described drawback, after much investigation, the present inventors have found that such a drawback can easily be overcome by using steel wool as a major portion of reinforcement with its surface being pretreated with a liquid thermosetting resin. The liquid thermosetting resins used in the invention are various kinds of phenolic resins, epoxy resins and melamine resins. As the friction articles are exposed to an elevated temperature and other several severe conditions, heat resistive strength (heat resistance) of the material is important.

DETAILED DESCRIPTION OF INVENTION

Phenolic resins are preferably used in this invention among the liquid thermosetting resins because of their excellent heat resistance. The phenolic resins preferred in this invention are, for instance, those made of a condensation reaction between one or several of such phenols as phenol, cresol, etc., and a formaldehyde or compounds emitting same, further those resins modified by cashew nut shell oil, polyvinylbutyral, vegetable oils, melamine, and epoxides. Among those resins, unmodified phenolic resins are more preferable to use because of their excellent heat resistance.

Examples of phenols which can be used in preparing a phenol aldehyde resole for use in practicing the invention include ortho-, para-directing hydroxy aromatic compounds having 6 to 24 carbon atoms such as phenol itself ($C_6H_5OH$), naphthol, anthranol and substituted derivatives thereof where the substituents on the aromatic compound are independently selected from hydrogen, halogen such as Cl, Br, and F, and hydrocarbon radicals such as:

a. alkyl groups or radicals of 1 to 60 carbon atoms, preferably of 1 to 30 carbon atoms, and their various isomeric forms and substituted on the aromatic nucleus in the ortho or para position;
b. cycloalkyl groups of 5 to 12 carbon atoms such as cyclohexyl, cyclopentyl, methylcyclohexyl, butylcyclohexyl, and so forth;
c. alkyl, aryl and cycloalkyl ketonic groups wherein the hydrocarbon portion is as defined above in (a) and (b);
d. alkyl, aryl and cycloalkyl carboxylic groups wherein the hydrocarbon part is defined as above in (a) and (b);
e. aryl groups of 6 to 24 carbon atoms such as phenyl, naphthyl, anthryl, and the like;
f. aryl substituted alkyl wherein the aryl is phenyl which may contain lower alkyl and/or hydroxy substituents so that the resulting hydroxy aromatic is, for example, a bisphenol;
g. the corresponding oxyhydrocarbon radicals; and
h. mixtures of the aforesaid hydroxy aromatics.

Suitable substituted phenols include meta-methyl phenol, m-propyl phenol, m-isobutyl phenol, m-sec-butyl phenol, m-tert-butyl phenol, m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol. The corresponding phenols substituted in the para-position can be used.

Among the aldehydes which may be used within the scope of this invention to produce either the resole are formaldehyde or any of its variations, such as 37 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (37 percent or higher), or in any of its low polymeric forms such as paraform or trioxane. Other aldehydes include para-aldehydes, furfural, 2-ethyl-hexanal, ethylbutyraldehyde, heptaldehyde and glyoxal, benzaldehyde and crotonaldehyde.

The alkaline catalyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

Liquid phenolic resins are prepared in any of such forms as organic or aqueous solution and emulsion.

When carrying out this invention, the organic solution is preferred otherwise there is a possibility of rusting the surface of the steel wool reinforcement. When an aqueous solution is applied in this invention, it is necessary to have a rust-preventive agent incorporated in the same.

In this invention, phenolic resole resins are preferred because of their excellent ease of processing and "wetting effect" on steel wool. A preferable viscosity range of liquid resoles is 1 to 55 centipoises. The most suitable liquid resole is prepared by the process of adding 0.8 to 3 mole, preferably 1 to 2 mole, of formaldehyde to one mole of phenols, e.g. phenol or cresol, reacting under such basic conditions as a pH 8 to 10. The resulting resin is either neutralized or left as it is thereafter.

By the incorporation of 0.2 to 5 weight percent of such silane coupling agents as epoxy-silanes, amino-silanes, mercapto-silanes and vinyl-silanes into the liquid phenolic resins, the "wetting effect" of said resins can be greatly improved.

Following are detailed embodiments of this invention. In the friction material of this invention, steel wool with filaments being 0.03 to 0.1 mm in diameter and 3 to 20 mm in length is used after it is pretreated by liquid thermosetting resins. In the pretreatment process, solid resin is coated on the steel wool in a proportion of about 0.3 to 5 weight percent of solid resin based on the weight of steel wool. It is no longer effective if said weight percentage is below about 0.3, and it is unfavorable for ease of processing if it exceeds about 5. Said pretreatment in this invention may be selected from any of such methods as mixing, impregnation, spraying, etc. of the liquid thermosetting resins so long as the liquid thermosetting resins are present as a "predetermined quantity" on the surface of steel wool, and the resins are treated by heat on said surface. On account of this heat treatment a reaction occurs and proceeds in said liquid thermosetting resins, from a half-hardened state to a complete hardened state with excellent adherence to the surface of the steel wool.

The pretreatment process of the invention can be carried out in a variety of methods such as the following:
(1) Dipping of steel wool into the liquid thermosetting resins and thereafter drying same under heat.
(2) Spraying the liquid thermosetting resins onto steel wool during mixing of it in a mixer and drying same under heat thereafter.
(3) Addition of the liquid thermosetting resins to mixer during mixing of preheated steel wool therein.

The mixer employed in the aforementioned process is, e.g. Banbury mixer, Henschell mixer, kneader, double-cone type blender, and high-speed muller. It is also inclusive within the scope of this invention that fillers of relatively high density such as barium sulfate or graphite are incorporated with steel wool in equal or less content to same during said pretreatment of steel wool. To steel wool being mixed in a mixer, such binders as phenolic resins, drying oils, thermosetting resins exemplified by cashew nut shell oil modified phenolic resins are added at any arbitrary occasion during mixing, and also such conventional fillers as at least one selected from barium sulfate, dusty cashew powder or graphite are added.

Pretreated steel wool should be present in a proportion of about 25 to 75 weight percent of the entire friction material involved in this invention. This is because the friction material should have to endure several severe conditions, elevated temperatures and dynamic pressure when it is molded and put to use. Variations of its application require the incorporated ratio of reinforcement to be changed, according to the application, and further is because an even distribution of the desired quantity of incorporated reinforcement in the resin matrix is necessary to maintain the strength of the molded articles furnishing performance or preventing deterioration in physical properties when in use.

If required, organic fibers or other inorganic fibers, pretreated or not by the same liquid thermosetting resins as are used in the pretreatment of steel wool, can be incorporated in the friction material.

A typical friction material of the resin coated steel wool of the invention, contains about 25 to 75 weight percent up to 40 weight percent other inorganic filler and abrasives, about 5 to 15 weight percent organic filler, including the friction particle, and about 15 to 30 weight percent binder; all percents are by weight of total composition.

The friction binder may be a phenolic resole or novolak resin prepared from the phenols and aldehydes disclosed herein.

The abrasives, that is, the friction imparting agents and fillers, which may be used, include, but are not limited to, brass chips, metal shavings and filings, silica, talc, wood flour, chalk, clay, mica, fiber glass, felt, carbon black, graphite, metal nitrides and oxides, and ground cashew nut shell oil polymerizate.

The mixture of components is molded under an elevated temperature and pressure. Further hardening reaction of the resin is accomplished through subsequent baking to produce friction articles.

This invention is clarified by the following examples:

EXAMPLE 1

A resole type phenolic resin with a 10 percent solid content was prepared by reacting phenol and formaldehyde (molar ratio 1:1.20) with ammonia as catalyst and diluted with methanol. 70 grams of this resin was sprayed onto the surface of steel wool (700 g.) rotated in a high speed muller, and heated immediately afterwards. After heated 30 minutes at 120° C. with continuing mixing, a pretreated steel wool was obtained, having a coating of 1 weight percent of solid resin based on the weight of steel wool.

Then, 700 g. of said pretreated steel wool, 100 g. of a novolac type phenolic resin, 100 g. of dusty cashew powder and 100 g. of barium sulfate are charged into a double-cone type blender, mixed for 15 minutes, and discharged as a uniform mixture. The mixture was molded at a temperature of 160° C. and pressure of 200 kg/cm$^2$ for 10 minutes. After baking at 180° C. for 3 hours, test specimens were obtained.

EXAMPLE 2

The procedure of Example 1 was repeated, except that 5 percent of an amino-silane coupling agent, with respect to the solid content of the phenolic resin, was added to the resole type phenolic resin mentioned in Example 1. Specimens were obtained in the same manner as described in Example 1.

EXAMPLE 3

The procedure of Example 1 was repeated, except that the resole type phenolic resin mentioned in Example 1 was modified by adding 15 percent polyvinyl butyral with respect to the solid content of phenolic resin. Specimens were obtained in the same manner as described in Example 1.

COMPARATIVE EXAMPLE 1

The procedure of Example 1 was repeated, except that the steel wool was not pretreated by a liquid thermosetting resin. Specimens were obtained in the same manner as described in Example 1.

The measured properties of specimens thus obtained in Examples 1, 2, 3 and Comparative Example 1 are listed in Table 1.

For the test specimens of Example 1 and Comparative Example 1, electron microscope photographs of the broken cross-section were taken.

Comparison of the photomicrographs indicates the resin successfully adheres to the surface of steel wool in Example 1.

TABLE 1

| Test Item | Conditioning | Example 1 | Example 2 | Example 3 | Comparative Example 1 |
|---|---|---|---|---|---|
| Bending strength ($kg/cm^2$) | at ambient temp. | 700 | 750 | 650 | 440 |
|  | at 200° C. | 410 | 420 | 340 | 230 |
| Rockwell hardness (Scale L) | at ambient temp. | 87 | 89 | 87 | 61 |
| Density ($g/cm^3$) | at ambient temp. | 2.95 | 2.95 | 2.93 | 2.92 |

What is claimed is:

1. In a friction material containing steel wool as the principal reinforcing material, the improvement wherein the steel wool is pretreated with a thermosetting resin to provide a coating of solid resin on the steel wool in a proportion of about 0.3 to 5 weight percent of solid resin based on the weight of steel wool.

2. The friction material of claim 1 which contains a thermosetting resin binder, a friction particle and one or more inert fillers.

3. The friction material according to claim 2 wherein the coated steel wool constitutes 25 to 75 weight percent of ingredients.

4. The friction material according to claim 1, 2 or 3 wherein the filament of steel wool is 0.03 to 0.1 mm in diameter and 3 to 20 mm in length.

5. The friction material according to claim 4 wherein the thermosetting resin coating is a phenolic resin.

6. The friction material according to claim 5 wherein a silane coupling agent is incorporated by 0.2 to 5 weight percent to the solid content of said phenolic resins.

7. The friction material according to claim 5 wherein phenolic resins are resole-type phenol-formaldehyde resins.

8. Friction material according to claim 1, 2 or 3, wherein the thermosetting resin coating is applied to the steel wool as a liquid, and thereafter, hardened with heat.

9. Friction material according to claim 5 wherein the thermosetting resin coating is applied to the steel wool as a liquid, and thereafter, hardened with heat.

10. Friction material according to claim 6 wherein the thermosetting resin coating is applied to the steel wool as a liquid, and thereafter, hardened with heat.

11. Friction material according to claim 7 wherein the thermosetting resin coating is applied to the steel wool as a liquid, and thereafter hardened with heat.

* * * * *